Sept. 22, 1925.
C. E. POPE ET AL
1,554,757
BUSHING AND REENFORCE FOR ROD COUPLINGS
Filed Sept. 19, 1924
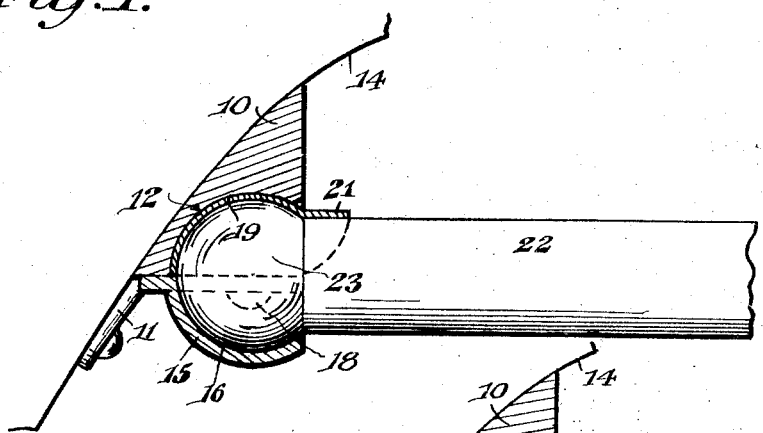
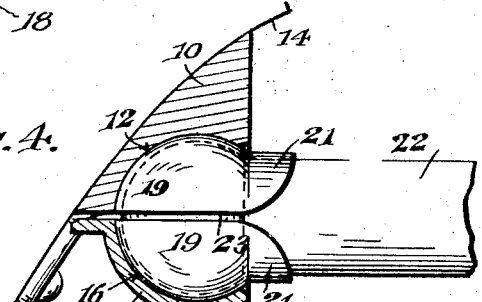
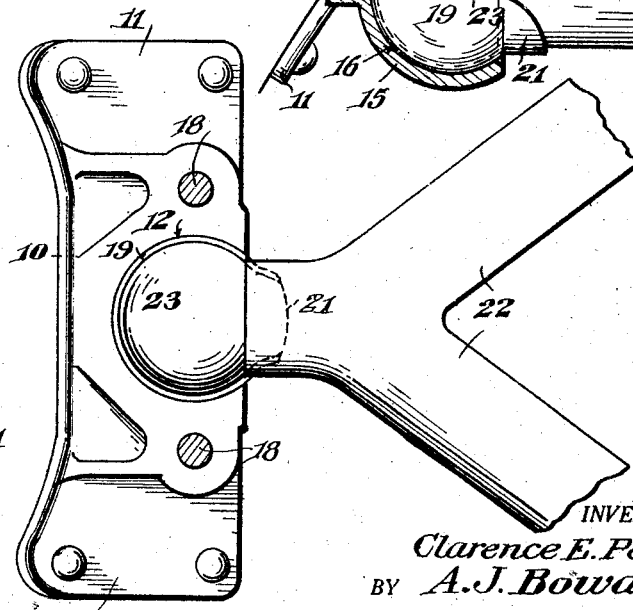
INVENTORS
Clarence E. Pope
BY A. J. Bowden,
Geo. P. Kimmel
ATTORNEY.

Patented Sept. 22, 1925.

1,554,757

UNITED STATES PATENT OFFICE.

CLARENCE E. POPE AND ALEX J. BOWDEN, OF WATERTOWN, SOUTH DAKOTA.

BUSHING AND REENFORCE FOR ROD COUPLINGS.

Application filed September 19, 1924. Serial No. 738,606.

*To all whom it may concern:*

Be it known that we, CLARENCE E. POPE and ALEX J. BOWDEN, citizens of the United States, residing at Watertown, in the county of Codington and State of South Dakota, have invented certain new and useful Improvements in Bushings and Reenforces for Rod Couplings, of which the following is a specification.

This invention relates to the couplings between two members, more particularly of a universal character, and has for one of its objects to improve the construction and increase the efficiency and utility of devices of this character.

Another object of the invention is to provide a device of this character having wear preventing means, and means whereby the parts are supported and strengthened and worn parts readily renewable without discarding the unworn or unimpaired parts.

With these and other objects in view the invention consists in certain novel features of construction as hereinafter shown and described and then specifically pointed out in the claim, and in the drawings illustrative of the preferred embodiment of the invention.

Figure 1 is a side elevation, partly in section.

Figure 2 is a bottom plan view without the cap member.

Figure 3 is a plan view of one of the combined bushing and supporting members.

Figure 4 is a view similar to Figure 1, illustrating a modification in the construction.

The improved device may be employed in connection with various forms of machinery, but is more particularly adapted for use in coupling the radius bars to the crank case or other part of a motor driven vehicle, and for the purpose of illustration is shown thus applied, but it will be understood that it is not desired to limit the invention for use in connection with any kind of machinery or apparatus to which it is adapted.

The improved device comprises a base or body member represented as a whole at 10 and with attaching flanges 11 and a half socket 12 in one face.

The member 10 is adapted to be attached by its flanges 11 to a support, for instance to the crank casing of a motor driven vehicle, or other convenient part of the vehicle, and indicated conventionally at 14.

Engaging over the socketed face of the base member is a cap device 15 having an opposing half socket 16, and with lateral ears to receive clamp bolts 18, by which it is attached to the base.

Fitting one or both of the half sockets, is a semi-globular bushing 19.

Extending from each bushing member is a semi-cylindrical lip or projection 21.

A portion of the stock of the member to be supported in the device is represented at 22, and provided with a globular terminal 23 to engage in the bushings 19 and the half sockets 12 and 16.

Where one bushing only is employed as shown in Figure 1, the globular head 23 will engage the bushing 19 at one side, for instance in the base 10, and the half socket 16 of the cap member 15, and if two bushings are employed as shown in Figure 4, then the globular terminals will bear in both bushings.

The lip portions 21 bear over the portion of the stock 22 adjacent to the globular terminal, and reenforce and support the stock at its juncture therewith.

The fracture or weak point of the member 22 is at the neck or juncture with the globular portion, and by reenforcing this weak portion by the lips 21, the life of the stock is lengthened and its durability and stability correspondingly increased.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described our invention what we claim is:

A device of the class described comprising a base member adapted to be attached to a support and having a half socket in one face, a cap member bearing upon the base member and having an opposing half socket, means for attaching the cap member to the base member, a bushing element fitting in one of said half sockets and having a semi-circular reenforcing lip extending therefrom beyond the lines of the body of the cap, and a member having a globular terminal engaging in said sockets and the bushing therein, said extended lip bearing over the portion of the member next to the globular terminal thereof and reenforcing the same at its juncture with the globular terminal.

In testimony whereof, we affix our signatures hereto.

CLARENCE E. POPE.
ALEX J. BOWDEN.